United States Patent
Lee

(10) Patent No.: US 12,438,701 B2
(45) Date of Patent: Oct. 7, 2025

(54) SYSTEM ON CHIP, SECURITY SYSTEM, AND METHOD OF PERFORMING AUTHENTICATION

(71) Applicant: Samsung Electronics Co., Ltd., Suwon-si (KR)

(72) Inventor: Hyunwook Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 281 days.

(21) Appl. No.: 17/994,594

(22) Filed: Nov. 28, 2022

(65) Prior Publication Data
US 2023/0188326 A1 Jun. 15, 2023

(30) Foreign Application Priority Data

Dec. 14, 2021 (KR) .................. 10-2021-0178880
Apr. 25, 2022 (KR) .................. 10-2022-0051028

(51) Int. Cl.
- *G06F 11/10* (2006.01)
- *G06F 12/14* (2006.01)
- *H04L 9/08* (2006.01)

(52) U.S. Cl.
CPC .................. *H04L 9/0825* (2013.01)

(58) Field of Classification Search
None
See application file for complete search history.

(56) References Cited

U.S. PATENT DOCUMENTS

| | | | |
|---|---|---|---|
| 6,968,420 B1 | 11/2005 | Giles et al. | |
| 7,117,352 B1 | 10/2006 | Giles et al. | |
| 9,021,246 B2 | 4/2015 | Baltes et al. | |
| 9,418,224 B2 | 8/2016 | Sekiya | |
| 9,798,887 B2 | 10/2017 | Keidar et al. | |
| 9,830,479 B2 | 11/2017 | Soja et al. | |
| 10,923,203 B2 | 2/2021 | Park et al. | |
| 2003/0188117 A1* | 10/2003 | Yoshino | G06F 21/6218 711/164 |
| 2015/0046717 A1 | 2/2015 | Hagiwara et al. | |
| 2015/0161408 A1* | 6/2015 | Shanbhogue | G06F 11/3656 726/27 |
| 2015/0242606 A1 | 8/2015 | Shin et al. | |
| 2015/0318050 A1* | 11/2015 | Huang | G11C 17/16 365/96 |
| 2018/0034625 A1* | 2/2018 | Hunacek | H04L 9/003 |
| 2020/0202017 A1* | 6/2020 | Parry | H04L 9/302 |
| 2020/0293659 A1* | 9/2020 | Yamada | G06F 21/572 |

* cited by examiner

*Primary Examiner* — Christopher B Robinson
(74) *Attorney, Agent, or Firm* — Muir Patent Law, PLLC

(57) ABSTRACT

Provided are a system on chip, a security system, and a method of performing authentication. The system-on-chip includes a non-volatile memory a key storage region and a key indicator region, and an authenticator configured to identify a storage location by using key indicator data in response to an authentication request received from an external device, obtain key data stored in the storage location from the non-volatile memory, and perform an encryption algorithm by using an input key received from the external device and an asymmetric key of the key data as inputs.

11 Claims, 12 Drawing Sheets

SYSTEM ON CHIP, SECURITY SYSTEM, AND METHOD OF PERFORMING AUTHENTICATION

CROSS-REFERENCE TO RELATED APPLICATIONS

This application is based on and claims priority under 35 U.S.C. § 119 to Korean Patent Application No. 10-2021-0178880, filed on Dec. 14, 2021 and Korean Patent Application No. 10-2022-0051028, filed on Apr. 25, 2022, in the Korean Intellectual Property Office, the disclosures of which are incorporated by reference herein in their entireties.

BACKGROUND

Aspects of the inventive concept relate to an electronic device, and more particularly, to a system on chip, a security system, and a method of performing authentication.

A debugging device is provided for debugging a system on chip. The system on chip blocks access to debugging devices that are not permitted from the outside. Such a debugging device may perform debugging on the system on chip only after passing through an authentication process using an encryption algorithm performed by the system on chip. In this regard, some information referenced in the authentication process is stored inside the system on chip during a manufacturing process of the system on chip, and the stored information is not changed after the system on chip is shipped.

However, when information stored once is leaked, a security function of the system on chip is neutralized. Accordingly, even after the system on chip is shipped, it is necessary to change information related to the security function as necessary.

SUMMARY

Aspects of inventive concept provide a system on chip for changing a key for authentication even after the system on chip is shipped, a security system, and a method of performing authentication.

According to an aspect of the inventive concept, there is provided a system on chip authenticating an external device including a non-volatile memory comprising a key storage region in which at least one piece of key data is stored, and a key indicator region in which key indicator data, indicating a storage location of data in the key storage region, is stored, and an authenticator configured to identify a storage location by using the key indicator data in response to the authentication request received from the external device, obtain key data stored in the storage location from the non-volatile memory, and perform an encryption algorithm by using an input key received from the external device and an asymmetric key of the key data as inputs.

According to another aspect of the inventive concept, there is provided a security system including an external device configured to transmit an input key, and a system on chip configured to authenticate the external device based on the input key, wherein the system on chip includes a non-volatile memory comprising a key storage region in which at least one piece of key data is stored, and a key indicator region in which key indicator data, indicating a storage location of data in the key storage region, is stored, and an authenticator configured to identify the storage location by using the key indicator data, obtain key data stored in the storage location from the non-volatile memory, and perform an encryption algorithm by using the input key and an asymmetric key of the key data as inputs.

According to another aspect of the inventive concept, there is provided a method of authenticating an external device including obtaining key indicator data from a one time programmable (OTP) memory, identifying a slot in which key data is stored among a plurality of slots included in the OTP memory, by using the key indicator data, obtaining an asymmetric key by reading the key data from the OTP memory, and performing an encryption algorithm by using an input key received from the external device and an asymmetric key of the key data as inputs.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the inventive concept will be described in detail with reference to the accompanying drawings.

Figure 1:
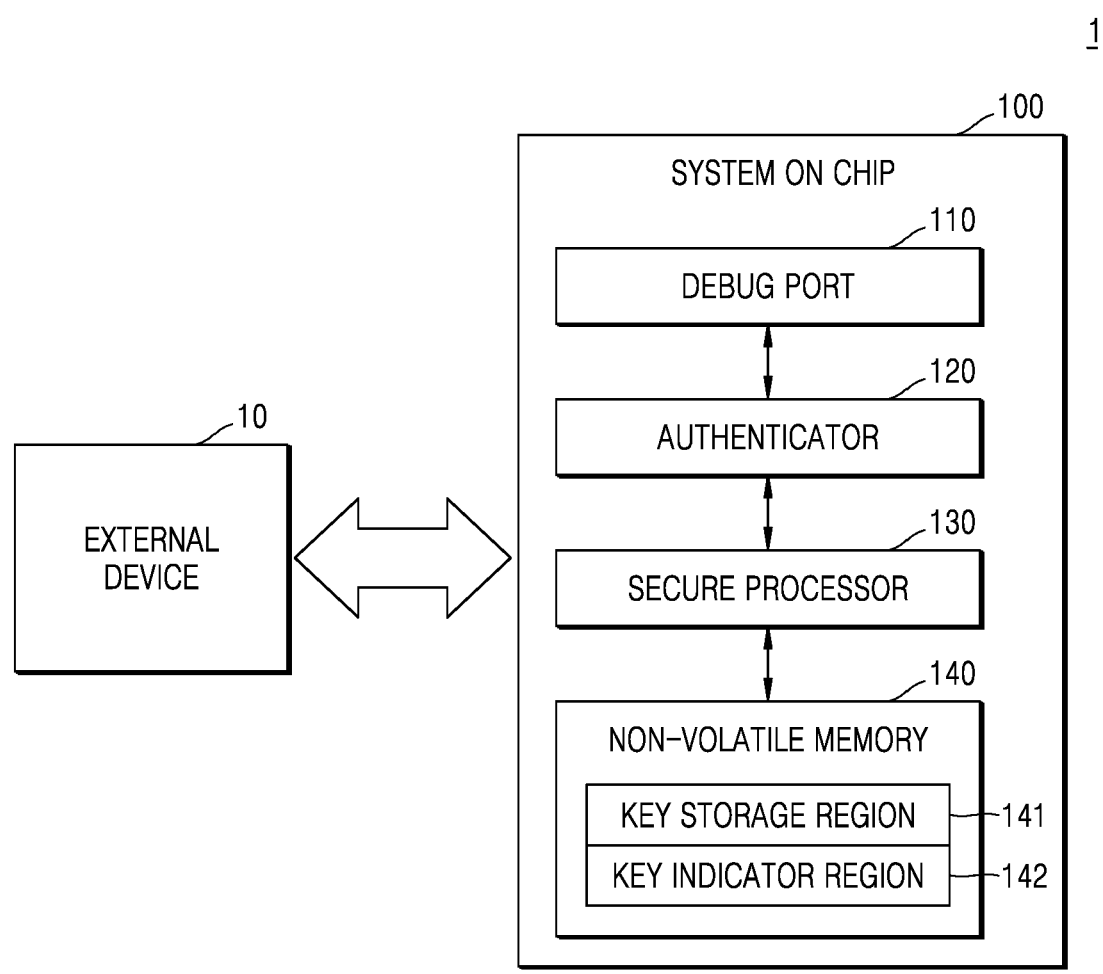
FIG. 1 is a diagram illustrating a security system according to an embodiment.

FIG. 1 is a diagram illustrating a security system 1 according to an embodiment.

Referring to FIG. 1, the security system 1 may include an external device 10 and a system on chip 100.

The external device 10 may communicate with the system on chip 100 through a communication interface. The external device 10 may access the system on chip 100 to change or correct parameters embedded in the system on chip 100, internal information of the system on chip 100, etc. The external device 10 may be implemented as, for example, a host or a debugging device.

In order for the external device 10 to change the internal information of the system on chip 100, the external device 10 needs to be authenticated by the system on chip 100. In an embodiment, the external device 10 may transmit an authentication request to the system on chip 100. Also, the external device 10 may transmit an input key to the system on chip 100 necessary for an authentication operation.

In an embodiment, when the external device 10 is implemented as the debugging device, the external device 10 may be compliant with the Joint Test Action Group (JTAG) standard, and, therefore, may be referred to as JTAG device or a JTAG debugging device. JTAG or the JTAG standard refers to a method of transmitting output data or receiving input data by using a serial communication method for digital input/output of a specific node in a digital circuit. A JTAG device or a JTAG debugging device may be a debugging device used for embedded system development.

The system on chip 100 may include a debug port 110, an authenticator 120, a secure processor 130, and a non-volatile memory 140.

The debug port 110 may receive or transmit a signal related to an authentication operation and/or a debugging operation from the external device 10. For example, an authentication request and an input key may be provided from the external device 10 to the system on chip 100 through the debug port 110.

The authenticator 120 may authenticate the external device 10. For example, the authenticator 120 may perform the authentication operation using an input key received from the external device 10 and a previously stored asymmetric key. Specifically, for example, the authenticator 120 may perform an encryption algorithm with the input key and the asymmetric key as inputs. When the input key and the asymmetric key match each other by an encryption algorithm, it may be determined that the external device 10 is successfully authenticated.

In an embodiment, the authenticator 120 may control the non-volatile memory 140 to obtain data stored in the non-volatile memory 140. Specifically, for example, the authenticator 120 may provide a read command and an address to the non-volatile memory 140 via the secure processor 130, and the non-volatile memory 140 may read data and provide the read data to the authenticator 120. Specifically, for another example, when the system on chip 100 is booted (or powered on), the data stored in the non-volatile memory 140 may be provided to and temporarily stored in the authenticator 120.

An "authenticator" of the inventive concept may be referred to as an "authentication protocol module".

The secure processor 130 is a physical chip that provides an isolated space to protect confidential data in security system 1. The secure processor 130 may provide for continuous scrambling and encrypting of data. The secure processor 130 may control the non-volatile memory 140. Specifically, for example, the secure processor 130 may provide data, a write command, and an address to the non-volatile memory 140. Accordingly, the data may be stored in the non-volatile memory 140. The secure processor 130 and the authenticator 120 may be combined such that the functionality of the authenticator 120 is executed by the secure processor 130. Accordingly, the authenticator 120 may not be provided separately from the secure processor 130.

The non-volatile memory 140 may perform an operation indicated by a command with respect to a memory cell selected by an address among memory cells. Here, the command may be, for example, a write command (or a program command), a read command, or an erase command, and the operation indicated by the command may be, for example, a write operation (or a program operation), a read operation, or an erase operation.

The non-volatile memory 140 may be, for example, a flash memory. The flash memory may include, for example, NAND flash memory, vertical NAND flash memory, NOR flash memory, resistive random access memory (RAM), phase-change memory, magnetoresistance RAM, etc. In an embodiment, the non-volatile memory 140 may be a one time programmable (OTP) memory.

In an embodiment, the non-volatile memory 140 may include a key storage region 141 and a key indicator region 142. The key storage region 141 may be a region in which at least one piece of key data is stored. The key indicator region 142 may be a region in which key indicator data is stored. The key indicator data may be data indicating a storage location of data in the key storage region 141. A "storage location" of the inventive concept may be a storage unit of key data. A "storage location" of the inventive concept may be referred to as a "slot". That is, the non-volatile memory 140 may include a plurality of slots storing key data. "Key indicator data" of the inventive concept may be referred to as "revocation information".

In an embodiment, when the non-volatile memory 140 includes the key storage region 141 and the key indicator region 142, the authenticator 120 may identify the storage location by using the key indicator data. Then, the authenticator 120 may obtain the key data stored in the storage location from the non-volatile memory 140. In addition, the authenticator 120 may perform an encryption algorithm by using the input key and the asymmetric key of the key data as inputs.

Figure 2:
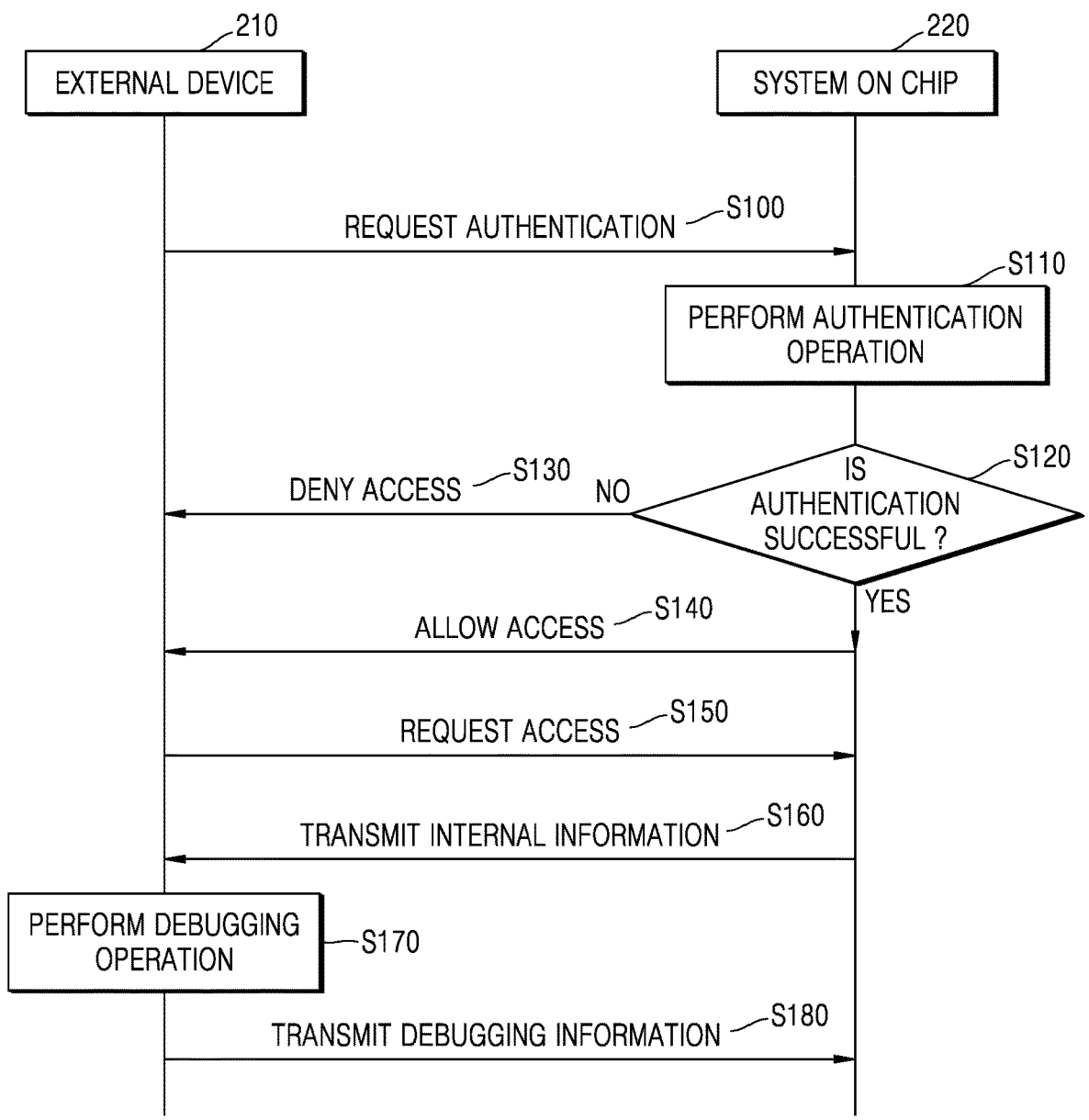
FIG. 2 is a diagram illustrating a method of operating a security system according to an embodiment.

FIG. 2 is a diagram illustrating a method of operating a security system according to an embodiment.

Referring to FIG. 2, an external device 210 and a system on chip 220 may correspond to the external device 10 and the system on chip 100 shown in FIG. 1, respectively.

In operation S100, the external device 210 may transmit an authentication request to the system on chip 220.

In operation S110, the system on chip 220 may perform an authentication operation in response to the authentication request.

In operation S120, the system on chip 220 may determine whether authentication is successful.

If authentication fails (S120, NO), in operation S130, the system on chip 220 may transmit a signal indicating access denied to the external device 210.

If authentication is successful (S120, Yes), in operation S140, the system on chip 220 may transmit a signal indicating access allowed to the external device 210.

In operation S150, the external device 210 may transmit an access request to the system on chip 220 to obtain internal information.

In operation S160, the system on chip 220 may transmit the internal information to the external device 210.

In operation S170, the external device 210 may perform a debugging operation based on the internal information.

In operation S180, the external device 210 may transmit the debugging information to the system on chip 220.

Hereinafter, a method of performing an authentication operation of the system on chip 220 shown in operation S110 will be described in detail.

Figure 3:
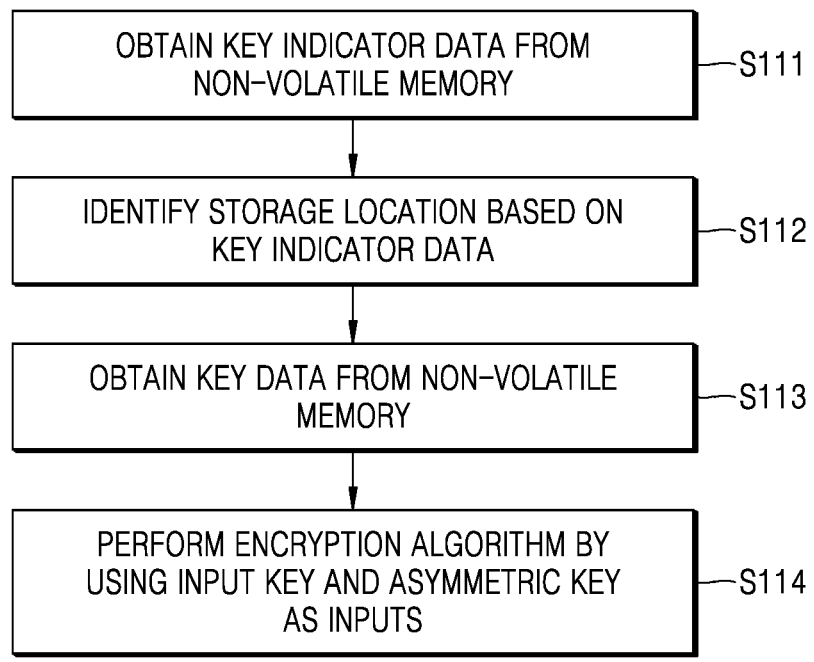
FIG. 3 is a flowchart illustrating an authentication method according to an embodiment.

FIG. 3 is a flowchart illustrating an authentication method according to an embodiment.

Referring to FIGS. 1 and 3, in operation S111, the authenticator 120 may obtain key indicator data from the non-volatile memory 140. Specifically, for example, the authenticator 120 may transmit a read command and an address to the non-volatile memory 140, and the non-volatile memory 140 may provide key indicator data to the authenticator 120. In an embodiment, when the non-volatile memory 140 is implemented as an OTP memory, the authenticator 120 may obtain the key indicator data from the OTP memory.

In operation S112, the authenticator 120 may identify a storage location in which key data to be used in an authentication operation is stored, based on the key indicator data.

In an embodiment, when the non-volatile memory 140 is implemented as the OTP memory, the authenticator 120 may identify a slot in which the key data is stored among a plurality of slots included in the OTP memory, by using the key indicator data.

In operation S113, the authenticator 120 may obtain the key data from the non-volatile memory 140. In an embodiment, when the non-volatile memory 140 is implemented as the OTP memory, the authenticator 120 may read key data from the OTP memory and obtain an asymmetric key. Here, the asymmetric key may be a value of a key to be used for the authentication operation.

In operation S114, the authenticator 120 may perform an encryption algorithm by using the input key and the asymmetric key of the key data as inputs. Here, the input key may be a key received from the external device 10.

Figure 4:
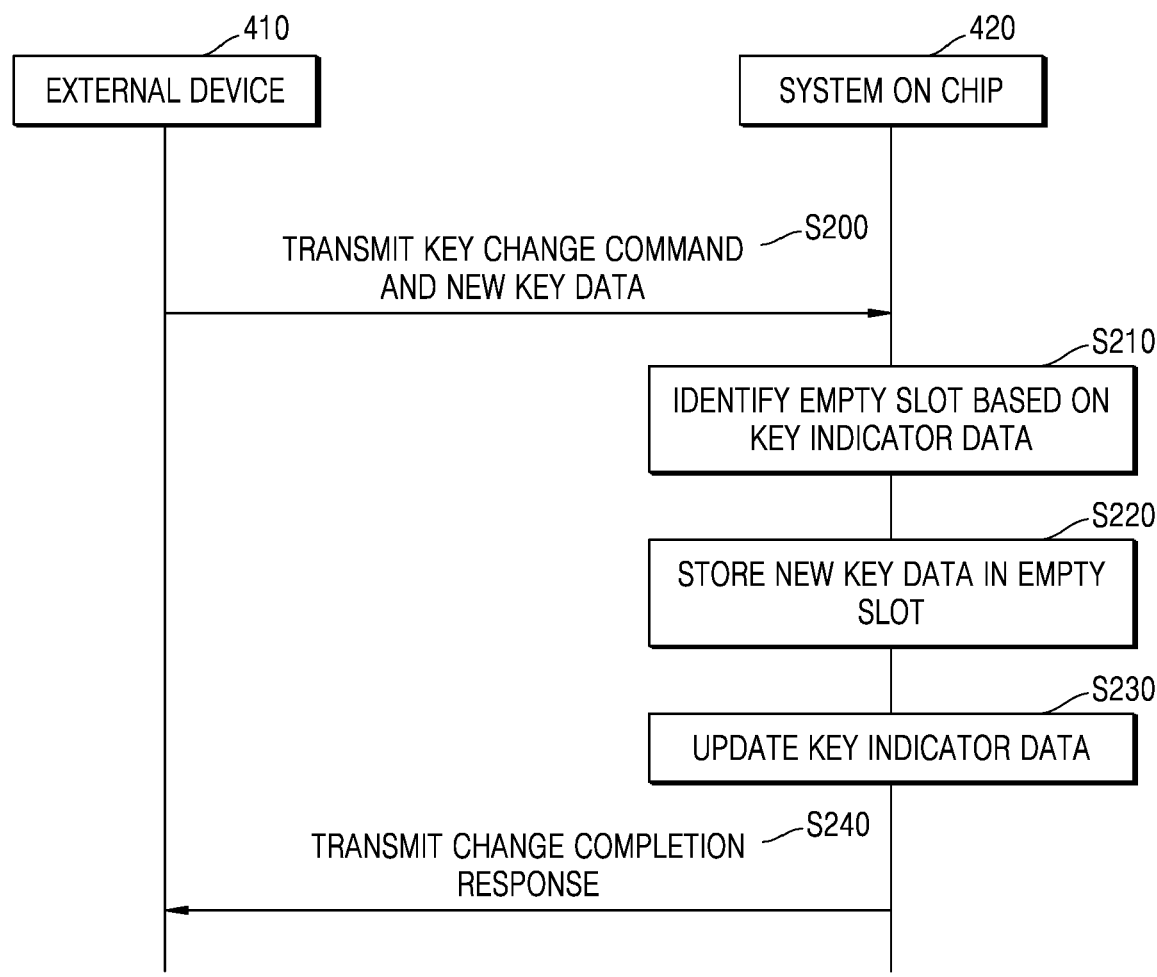
FIG. 4 is a diagram illustrating a method of changing an asymmetric key according to an embodiment.

FIG. 4 is a diagram illustrating a method of changing an asymmetric key according to an embodiment.

Referring to FIGS. 1 and 4, an external device 410 and a system on chip 420 may correspond to the external device 10 and the system on chip 100 shown in FIG. 1, respectively. Alternatively, the external device 410 and the system on chip 420 may correspond to the external device 210 and the system on chip 220 shown in FIG. 2, respectively. It is assumed that the external device 410 shown in FIG. 4 is authenticated with respect to the system on chip 420.

In operation S210, the system on chip 420 may identify an empty slot based on key indicator data. Referring to FIG. 1, for example, the authenticator 120 may identify the empty slot among a plurality of slots included in a non-volatile memory (e.g., an OTP memory), by using the key indicator data.

In operation S210, the system on chip 420 may identify an empty slot based on key indicator data. Referring to FIG. 1, for example, the authenticator 120 may identify the empty slot among a plurality of slots included in a non-volatile memory (e.g., an OPT memory), by using the key indicator data.

In operation S220, the system on chip 420 may store the new key data in the empty slot.

In operation S230, the system on chip 420 may update the key indicator data to indicate (e.g., reference or point to) the slot in which the new key data is stored.

In operation S240, the system on chip 420 may transmit a change completion response.

In an embodiment, when the key indicator data is updated, the authenticator 120 may obtain the new key data in response to a new authentication request from an unauthenticated device. Here, the unauthenticated device may be a device different from the external device 410, which is authenticated.

Figure 5:
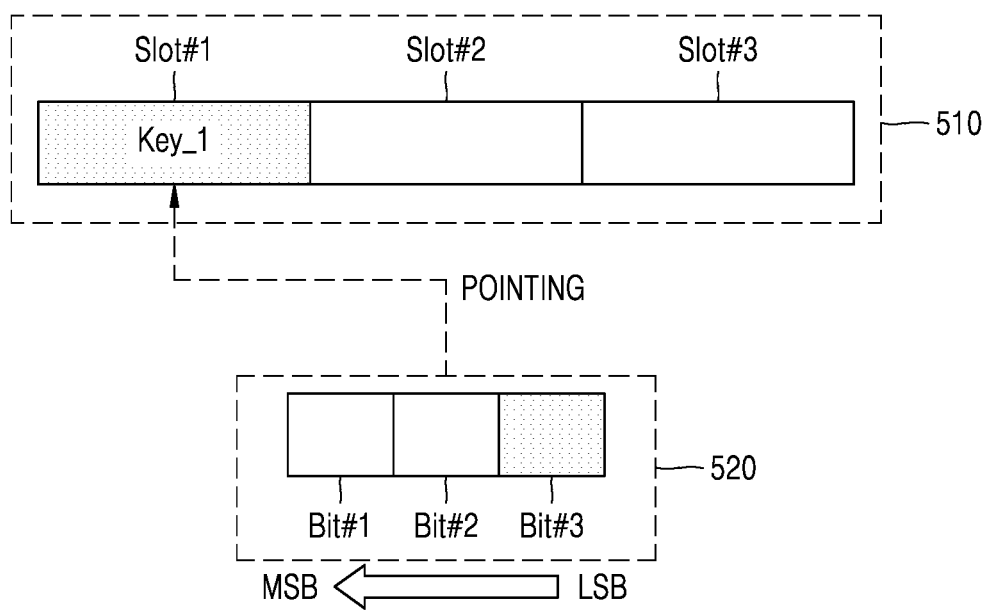
FIG. 5 is a diagram illustrating a non-volatile memory according to an embodiment.

FIG. 5 is a diagram illustrating a non-volatile memory 500 according to an embodiment.

Referring to FIG. 5, the non-volatile memory 500 may correspond to the non-volatile memory 140 shown in FIG. 1.

The non-volatile memory 500 may include a key storage region 510 and a key indicator region 520.

In an embodiment, the key storage region 510 may include first to N-th slots. N may be an integer equal to or greater than 2. Referring to FIG. 5, for example, the key storage region 510 may include first to third slots Slot #1, Slot #2, and Slot #3. However, aspects of the inventive concept are not limited thereto. Hereinafter, it is assumed that the number of slots is three. The key storage region 510 may store at least one piece of key data. Referring to FIG. 5, for example, first key data Key_1 may be stored in the first slot Slot #1, and the second and third slots Slot #2 and Slot #3 may be empty. However, aspects of the inventive concept are not limited thereto.

The key indicator region 520 may include first to N-th bit cells. The first to N-th bit cells may respectively correspond to first to N-th bit positions. For example, a k-th bit cell may correspond to a k-th bit position. Here, k may be a natural number less than or equal to N. Referring to FIG. 5, for example, the key indicator region 520 may include first to third bit cells Bit #1, Bit #2, and Bit #3. However, the inventive concept is not limited thereto. Hereinafter, it is assumed that the number of bit cells is three. In this regard, storing the key indicator data in the key indicator region 520 may correspond to a state in which the first to third bit cells Bit #1, Bit #2, and Bit #3 are programmed or free. Among the first to third bit cells Bit #1, Bit #2, and Bit #3, the first bit cell Bit #1 may be a most significant bit (MSB), and the third bit cell Bit #3 may correspond to a least significant bit (LSB), but aspects of the inventive concept are not limited thereto.

The third bit cell Bit #3, the second bit cell Bit #2, and the first bit cell Bit #1 may be sequentially programmed.

In an embodiment, when the first to k-th bit cells among the first to N-th bit cells are programmed, a storage location in which the key data is stored, specifically, the storage location in which the key to be used for the authentication operation is stored, may be the k-th slot among the first to N-th slots. The first to k-th bit cells may correspond to the first to k-th bit positions (k is a natural number less than or equal to N). Referring to FIG. 5, for example, when only the third bit cell Bit #3 among the first to third bit cells Bit #1, Bit #2, and Bit #3 is programmed, the storage location in which the key to be used for the authentication operation is stored may be the first slot Slot #1 among the first to third slots Slot #1, Slot #2, and Slot #3. For another example, when the second bit cell Bit #2 and the third bit cell Bit #3 are programmed, the storage location in which the key to be used for the authentication operation is stored may be the second slot Slot #2 among the first to third slots Slot #1, Slot #2 and Slot #3. For another example, when the first to third bit cells Bit #1, Bit #2, and Bit #3 are programmed, the storage location in which the key to be used for the authentication operation is stored may be the third slot Slot #3 among the first to third slots Slot #1, Slot #2, and Slot #3.

Figure 6A:
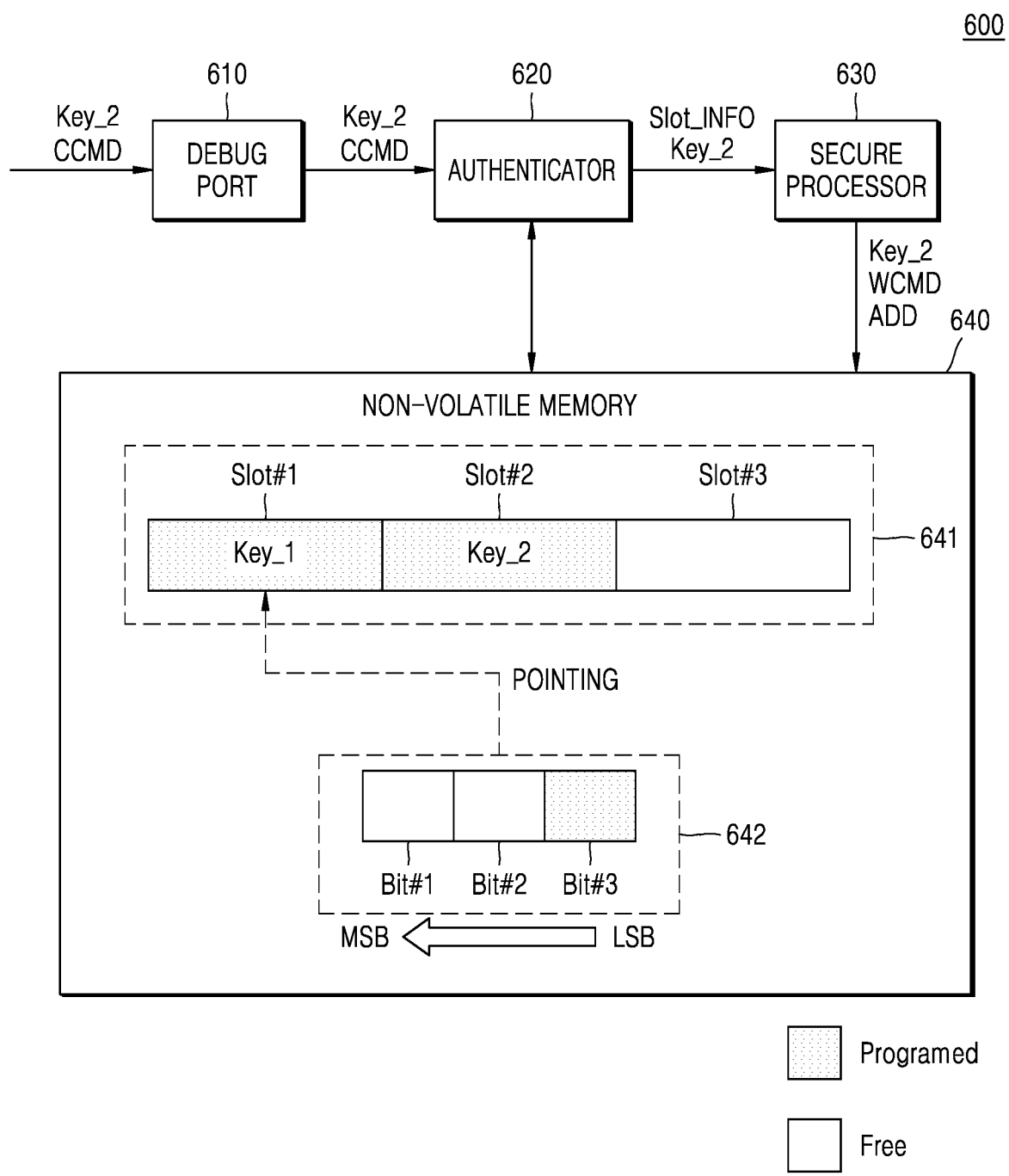
FIGS. 6A and 6B are diagrams illustrating an embodiment in which valid key data is stored.
Figure 6B:
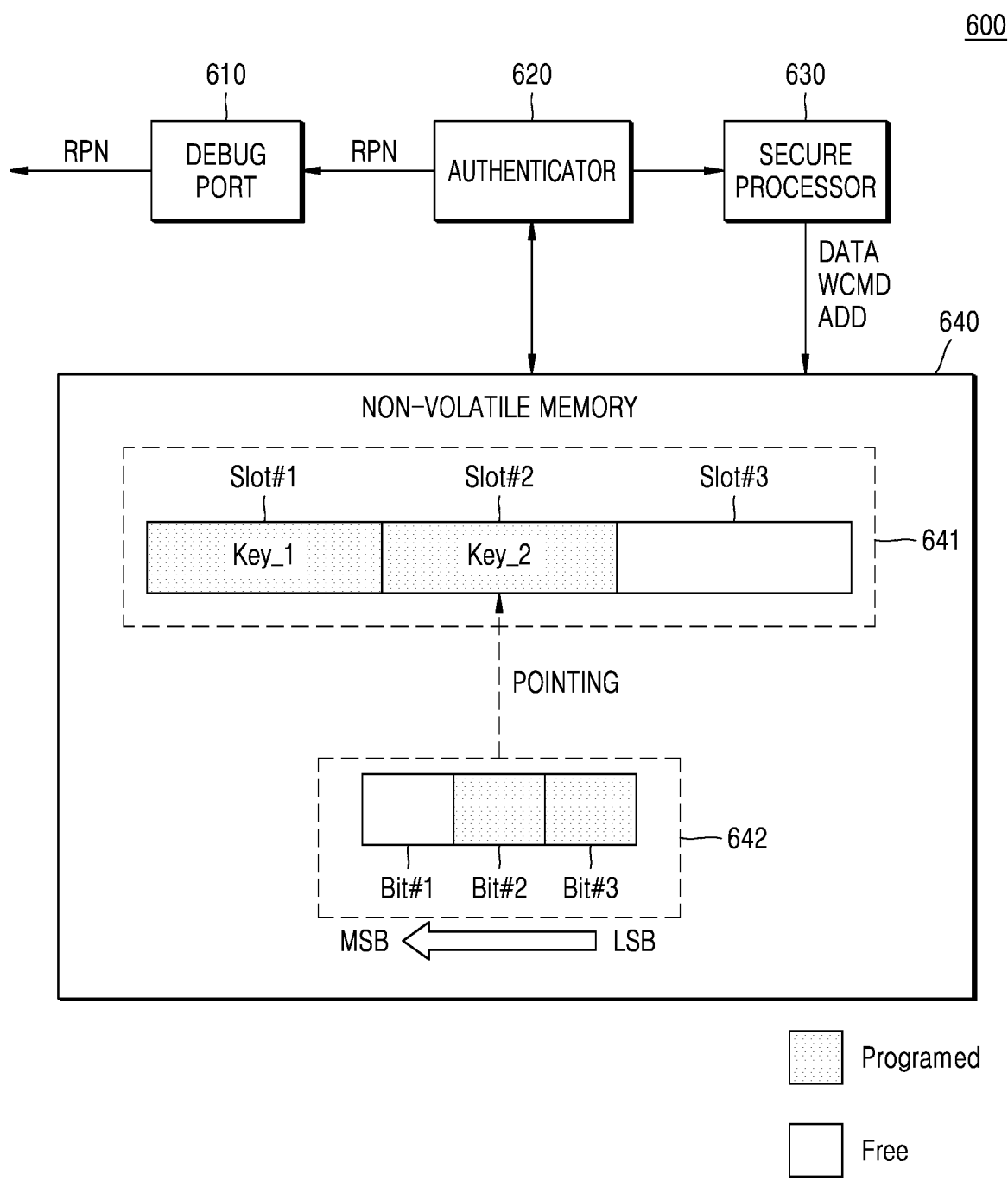

FIGS. 6A and 6B are diagrams illustrating an embodiment in which valid key data is stored.

Referring to FIG. 6A, it is assumed that first key data Key_1 is stored in a non-volatile memory 640 during a manufacturing process of a system on chip 600. The first key data Key_1 may be stored, for example, in the first slot Slot #1 of a key storage region 641. When the system on chip 600 is shipped, it is assumed that the second and third slots Slot #2 and Slot #3 of the key storage region 641 are empty. Key indicator data stored in a key indicator region 642 may indicate (e.g., reference or point to) the first slot Slot #1. Specifically, only the third bit cell Bit #3 among the first to third bit cells Bit #1, Bit #2, and Bit #3 included in the key indicator region 642 may be programmed, and the first bit cell Bit #1 and the second bit cell Bit #2 may be free.

An authenticated external device (e.g., the external device 10 illustrated in FIG. 1. May provide second key data Key_2 and a key change command CCMD to the system on chip 600. In this case, the second key data Key_2 and the key change command CCMD may be transferred to an authenticator 620 through a debug port 610. In an embodiment, the second key data Key_2 may be valid data.

The authenticator 620 may receive the key change command CCMD and the second key data Key_2. In addition, the authenticator 620 may identify an empty storage location in the key storage region 641, by using the key indicator data. For example, because the third bit cell Bit #3 is programmed in the key indicator region 642 and the first and second bit cells Bit #1 and Bit #2 are free, current key indicator data may indicate (e.g., reference or point to) the first slot Slot #1. The authenticator 620 may identify that at least the second slot Slot #2 is empty. Accordingly, the second slot Slot #2 may be an empty storage location. The authenticator 620 may provide slot data Slot_INFO and the second key data Key_2 to a secure processor 630. The slot data Slot_INFO may be data indicating the empty storage location, that is, an empty slot. Referring to FIG. 6A, the slot data Slot_INFO may indicate the second slot Slot #2. As the third slot Slot #3 is also empty, the authenticator 620 may alternatively provide slot data Slot_INFO that indicates the third slot Slot #3. For example, when more than one slot is empty, the authenticator 620 may select any one of the empty slots, and provide the associated slot data Slot INFO of the selected slot to the secure processor 630. The authenticator 620 may select any one of the empty slots based a random selection, sequential selection, etc.

In the instance in which the authenticator 620 provides the slot data Slot INFO indicating the second slot Slot #2, the secure processor 630 may provide an address ADD corresponding to the empty storage location (e.g., the second slot Slot #2), the valid key data (e.g., the second key data Key_2), and a write command WCMD to the non-volatile memory 640. The non-volatile memory 640 may store the valid key data (e.g., the second key data Key_2 in the empty storage location (e.g., the second slot Slot #2) in response to the write command WCMD.

Meanwhile, because the current key indicator data indicates (e.g., references or points to) the first slot Slot #1, and key data to be used for an authentication operation is the second key data Key_2 stored in the second slot Slot #2 of the key storage region 641, it is necessary to update the key indicator data such that the key indicator data indicates (e.g., references or points to) the second slot Slot #2.

Referring to FIG. 6B, the secure processor 630 may control the non-volatile memory 640 to update the key indicator data. Specifically, for example, the secure processor 630 may provide data DATA, the address ADD corresponding to a bit cell in a free state (e.g., the second bit cell Bit #2), and the write command WCMD to the non-volatile memory 640. Here, the data DATA may be for programming the bit cell in the free state. The non-volatile memory 640 may program the bit cell in the free state. In this instance, the non-volatile memory 640 may program the second bit cell Bit #2. As a result, among the first to third bit cells Bit #1, Bit #2, and Bit #3, the second and third bit cells Bit #2 and Bit #3 are programmed, and the first bit cell Bit #1 is free. Therefore, the key indicator data may now indicate (e.g., reference or point to) the second slot Slot #2.

The authenticator 620 may transmit a response RPN to the key change command CCMD to an authenticated external device (e.g., the external device 10 shown in FIG. 1) through a debug port 610.

When the key indicator data is updated, the authenticator 620 may obtain the second key data Key_2 from the non-volatile memory 640 in response to a new authentication request.

As described above, after the system on chip 600 is shipped, a key for authentication is changed, which may further strengthen the security of the system on chip 600.

Figure 7A:
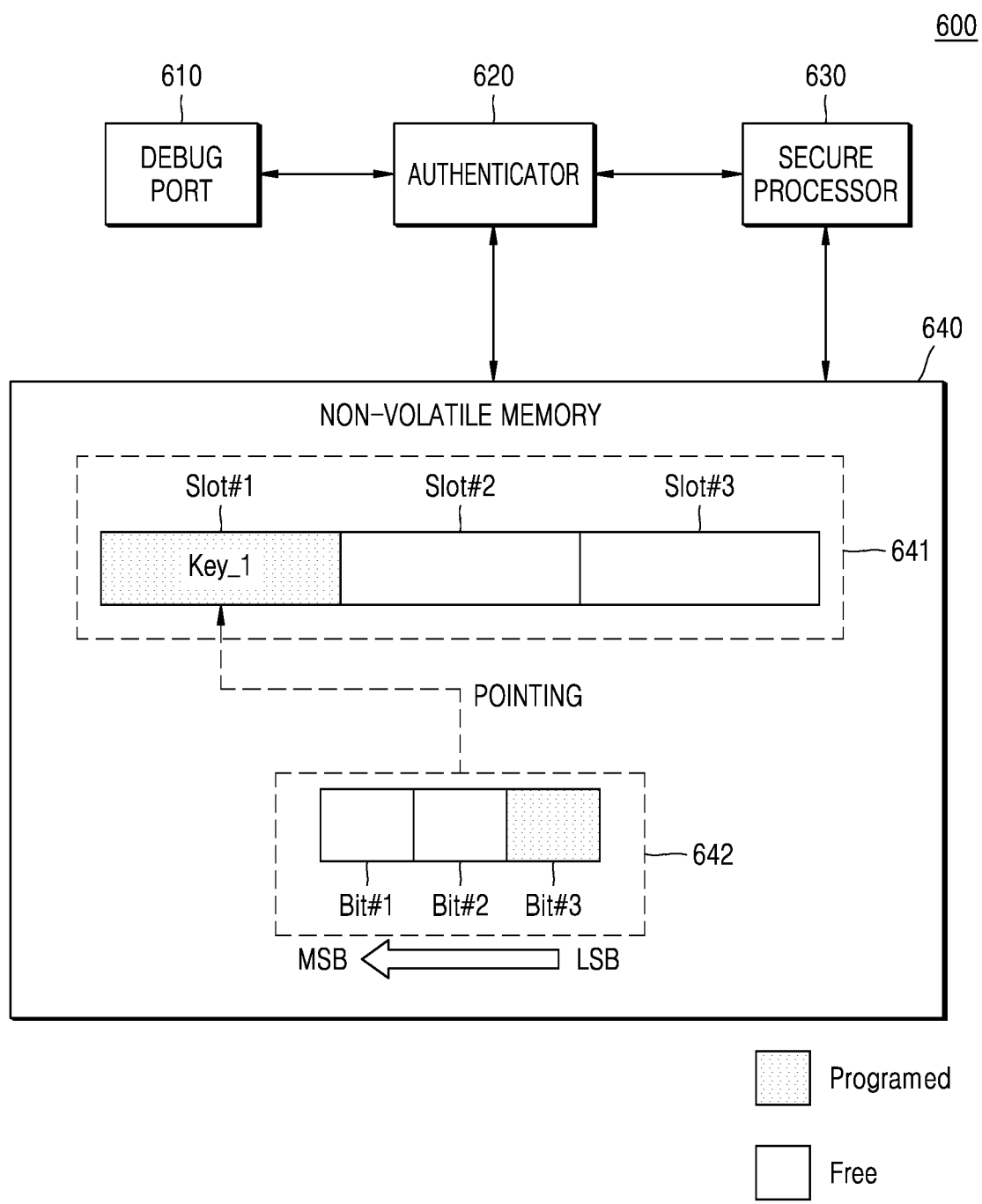
FIGS. 7A, 7B, and 7C are diagrams illustrating an embodiment in which invalid key data is stored.
Figure 7B:
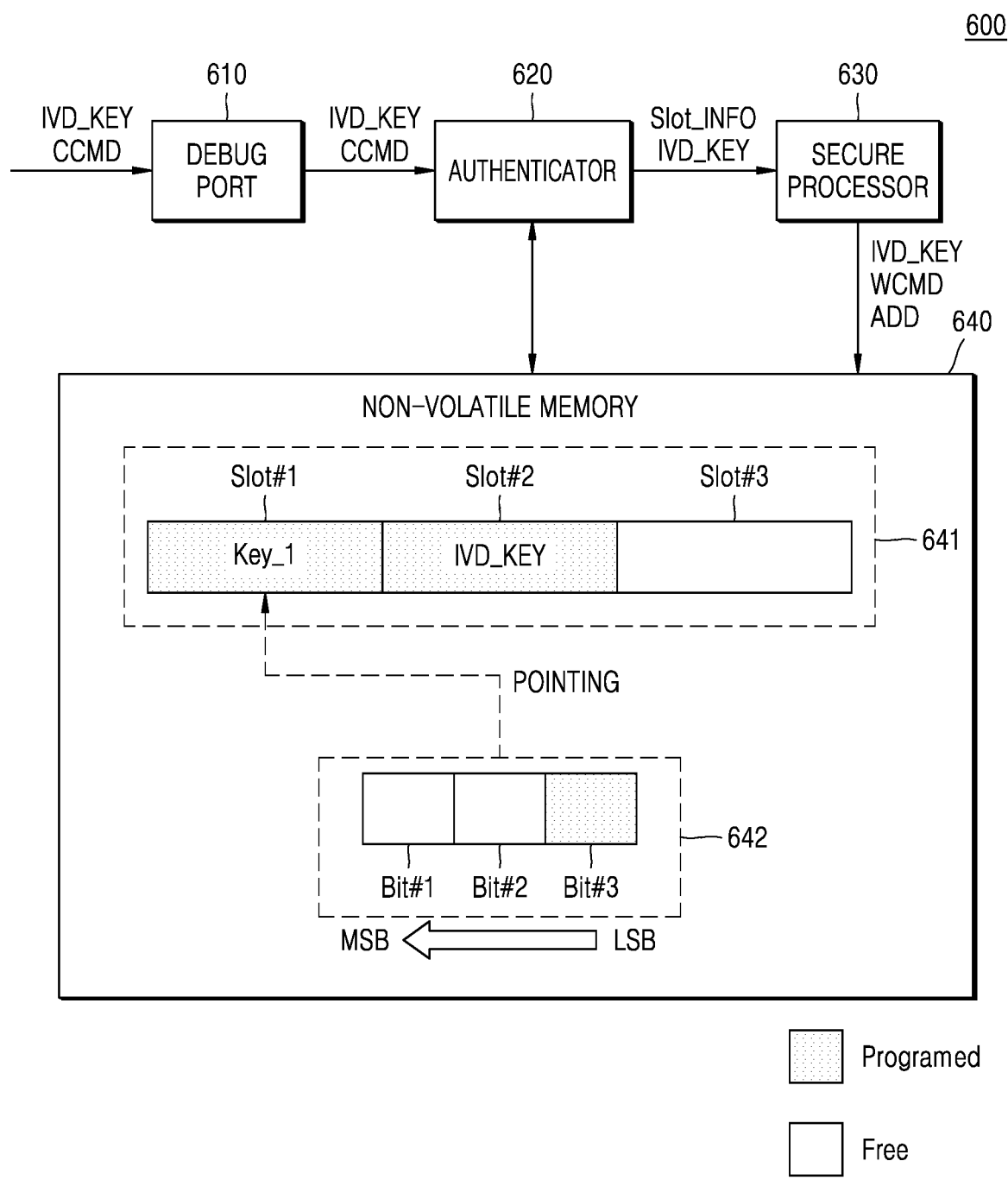
Figure 7C:
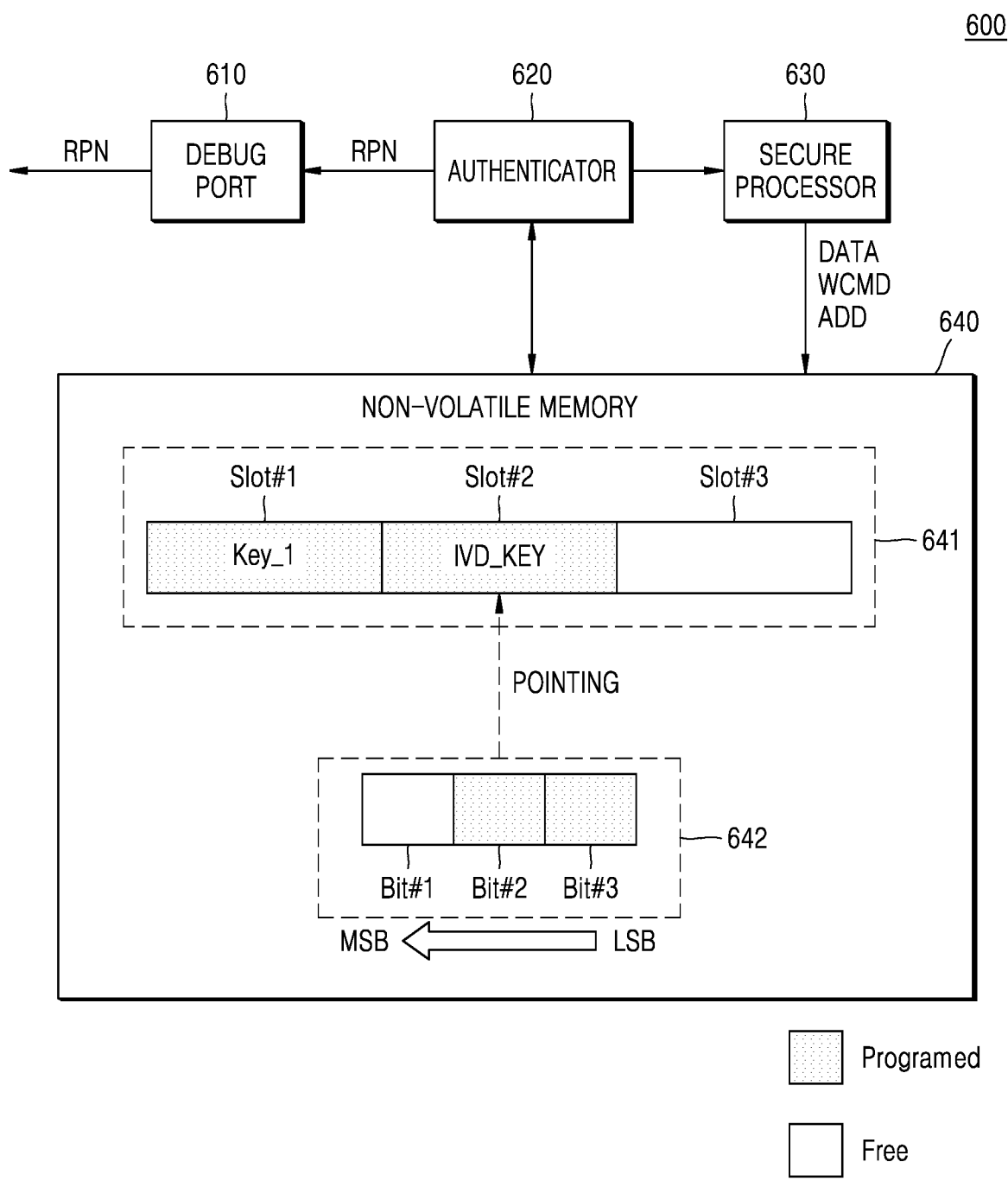

FIGS. 7A to 7C are diagrams illustrating an embodiment in which invalid key data IVD_KEY is stored.

Referring to FIG. 7A, it is assumed that the first key data Key_1 is stored in the first slot Slot #1 of the key storage region 641 during a manufacturing process of the system on chip 600. Also, it is assumed that the second and third slots Slot #2 and Slot #3 of the key storage region 641 are empty when the system on chip 600 is shipped.

Referring to FIG. 7B, an authenticated external device (e.g., the external device 10 shown in FIG. 1) may provide the invalid key data IVD_KEY and the key change command CCMD to the system on chip 600. In an embodiment, the invalid key data IVD_KEY may be, for example, data having an arbitrary value. Alternatively, according to an embodiment, the invalid key data IVD_KEY may be dummy data.

The authenticator 620 may receive the key change command CCMD and the invalid key data IVD_KEY through the debug port 610. In addition, the authenticator 620 may identify an empty storage location (e.g., the second slot Slot #2) in the key storage region 641 by using key indicator data. The authenticator 620 may provide the slot data Slot_INFO and the invalid key data IVD KEY to the secure processor 630. Referring to FIG. 7A, the slot data Slot_INFO may indicate the second slot Slot #2.

The secure processor 630 may provide the address ADD corresponding to the empty storage location (e.g., the second slot Slot #2 shown in FIG. 7A), the invalid key data IVD_KEY, and the write command WCMD to the non-volatile memory 640.

Referring to FIG. 7C, the secure processor 630 may control the non-volatile memory 640 to update the key indicator data. Specifically, for example, the secure processor 630 may provide the data DATA, the address ADD corresponding to a bit cell in a free state (e.g., the second bit cell Bit #2), and the write command WCMD to the non-volatile memory 640. Because among the first to third bit cells Bit #1, Bit #2, and Bit #3, the second and third bit cells Bit #2 and Bit #3 are programmed, and the first bit cell Bit #1 is free, the key indicator data may indicate the second slot Slot #2.

The authenticator 620 may transmit the response RPN to the key change command CCMD to the authenticated external device (e.g., the external device 10 shown in FIG. 1) through the debug port 610.

The system on chip 600 may perform the authentication operation using the invalid key data IVD_KEY, thereby preventing authentication of an unauthenticated external device.

As described above, after the system on chip 600 is shipped, a key for authentication is changed to the invalid data, which may prevent hacking.

Figure 8:
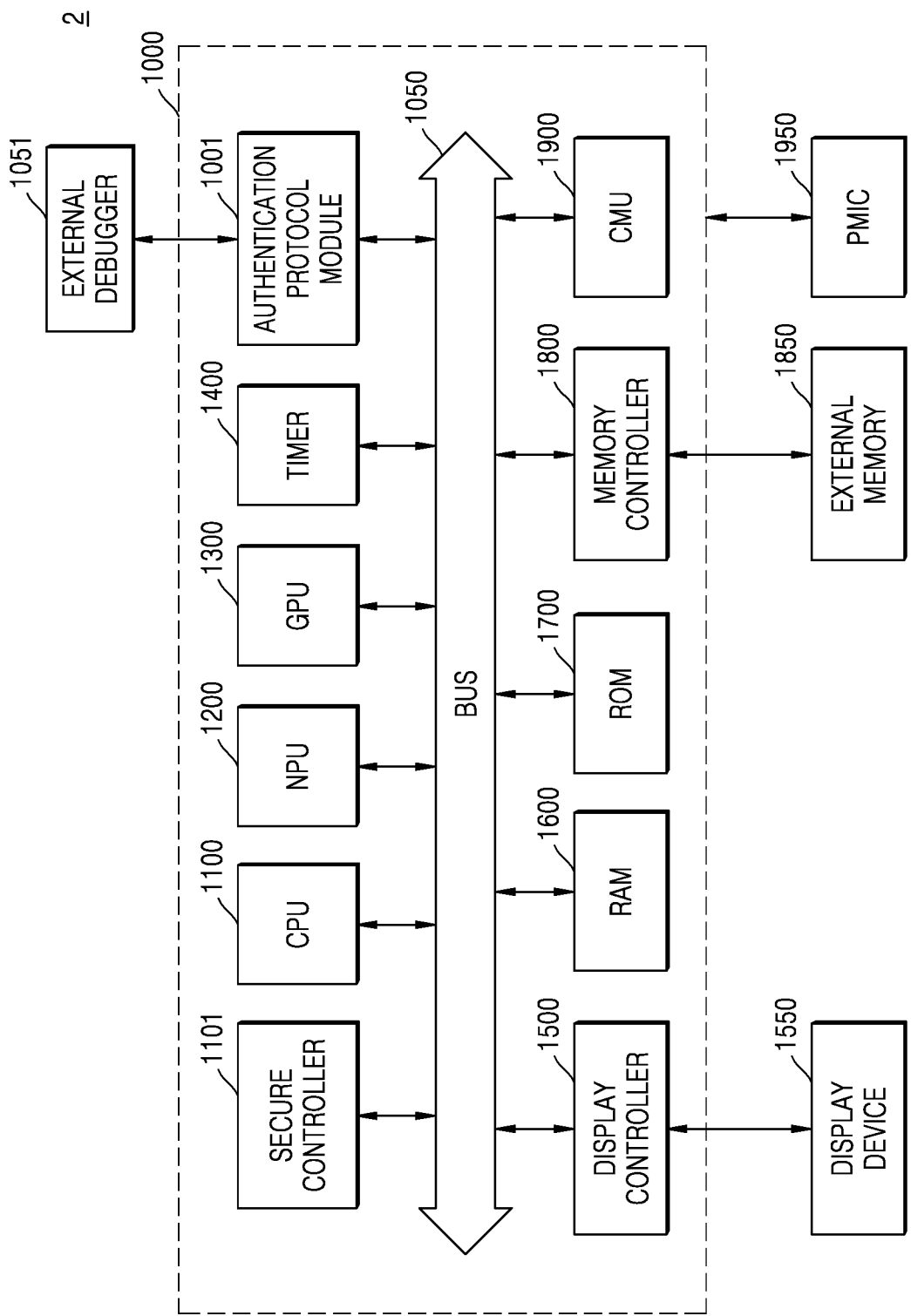
FIG. 8 is a block diagram illustrating a security system according to another embodiment.

FIG. 8 is a block diagram illustrating a security system 2 according to another embodiment.

Referring to FIG. 8, the security system 2 may include a system on chip 1000, an external debugger 1051, a display device 1550, an external memory 1850, and a power management integrated circuit (PMIC) 1950.

The external debugger 1051 may correspond to the external device 10 shown in FIG. 1. The external debugger 1051 may transmit an authentication request and input key data to the system on chip 1000. When the external debugger 1051 is authenticated, the external debugger 1051 may obtain internal information of the system on chip 1000 and perform a debugging operation based on the internal information. The external debugger 1051 may include a processor for executing instructions related to a debugging process and an authentication process. The external debugger 1051 may also include memory for storing data related to the debugging process (e.g., instructions executable by the processor) and the authentication process (e.g., an input key).

The system on chip 1000, the display device 1550, the external memory 1850, and the PMIC 1950 may be implemented as a handheld device. Examples of the handheld device may include a mobile phone, a smartphone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, or an e-book.

The system on chip 1000 may include an authentication protocol module 1001, a central processing unit (CPU) 1100, a secure controller 1101, a neural network processing unit (NPU) 1200, a graphics processing unit (GPU) 1300, a timer 1400, a display controller 1500, random access memory (RAM) 1600, read only memory (ROM) 1700, a memory controller 1800, a clock management unit (CMU) 1900, and a bus 1050. The system on chip 1000 may further include other components in addition to the illustrated components.

The authentication protocol module 1001 may correspond to the authenticator 120 shown in FIG. 1.

The CPU 1100 may also be called a processor, and may process or execute programs and/or data stored in the external memory 1850. For example, the CPU 1100 may process or execute programs and/or data in response to an operation clock signal output from the CMU 1900.

The CPU 1100 may be implemented as a multi-core processor. The multi-core processor may a single computing component including two or more independent substantive processors (called 'cores'), each of which may read and execute program instructions. Programs and/or data stored in the ROM 1700, the RAM 1600, and/or the external memory 1850 may be loaded into a memory (not shown) of the CPU 1100 as needed.

The secure controller 1101 may read programs and/or data stored in the ROM 1700, the RAM 1600, and/or the external memory 1850 under the control of the CPU 1100. Alternatively, the secure controller 1101 may store programs and/or data stored in the ROM 1700, the RAM 1600, and/or the external memory 1850 under the control of the CPU 1100. The CPU 1100 and the secure controller 1101 may be included in the secure processor 130 illustrated in FIG. 1.

The NPU 1200 may efficiently process a large-scale operation using an artificial neural network. The NPU 1200 may perform deep learning by supporting multiple simultaneous matrix operations.

The GPU 1300 may convert data read from the external memory 1850 by the memory controller 1800 into a signal suitable for the display device 1550.

The timer 1400 may output a count value indicating time based on the operation clock signal output from the CMU 1900.

The display device 1550 may display image signals output from the display controller 1500. For example, the display device 1550 may be implemented as a liquid crystal display (LCD), a light emitting diode (LED) display, an organic LED (OLED) display, an active-matrix OLED (AMOLED) display, or a flexible display. The display controller 1500 may control the operation of the display device 1550.

The RAM 1600 may temporarily store programs, data, or instructions. For example, programs and/or data stored in the memory may be temporarily stored in the RAM 1600 under the control of the CPU 1100 or according to a booting code stored in the ROM 1700. The RAM 1600 may be implemented as dynamic RAM (DRAM) or static RAM (SRAM).

ROM 1700 may store permanent programs and/or data. The ROM 1700 may be implemented as an erasable programmable read-only memory (EPROM) or an electrically erasable programmable read-only memory (EEPROM).

In an embodiment, the ROM 1700 may be implemented as an OTP memory. The ROM 1700 may correspond to the non-volatile memory 140 shown in FIG. 1.

The memory controller 1800 may communicate with the external memory 1850 through an interface. The memory controller 1800 may control the overall operation of the external memory 1850 and control data exchange between a host and the external memory 1850. For example, the memory controller 1800 may write data to or read data from the external memory 1850 according to a request of the host. Here, the host may be a master device such as the CPU 1100, the GPU 1300, or the display controller 1500.

The external memory 1850 is a storage medium for storing data, and may store an operating system (OS), various programs, and/or a variety of data. The external memory 1850 may be, for example, DRAM, but is not limited thereto. For example, the external memory 1850 may be a non-volatile memory device (e.g., a flash memory, a phase change RAM (PRAM), a magnetic RAM (MRAM), a resistive RAM (RRAM), or a FeRAM device). In another embodiment, the external memory 1850 may be an internal memory provided inside the system on chip 1000. Also, the external memory 1850 may be a flash memory, an embedded multimedia card (eMMC), or a universal flash storage (UFS).

The CMU 1900 may generate an operation clock signal. The CMU 1900 may include a clock signal generator such as a phase locked loop (PLL), a delayed locked loop (DLL), or a crystal oscillator.

The operation clock signal may be supplied to the GPU 1300. The operation clock signal may be supplied to other components (e.g., the CPU 1100 or the memory controller 1800). The CMU 1900 may change a frequency of the operation clock signal.

The CPU 1100, the NPU 1200, the GPU 1300, the timer 1400, the display controller 1500, the RAM 1600, the ROM 1700, the memory controller 1800, and the CMU 1900 may communicate with each other via the bus 1050.

The PMIC 1950 may be implemented outside the system on chip 1000. However, aspects of the inventive concept are not limited thereto, and a power management unit (PMU) capable of performing a function of the PMIC 1950 may be included in the system on chip 1000.

Figure 9:
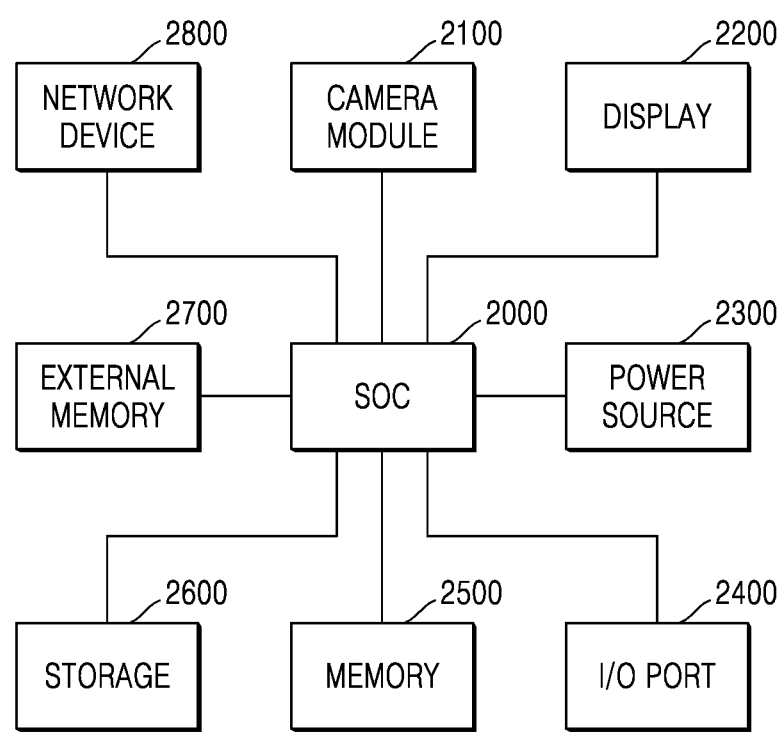
FIG. 9 is a block diagram illustrating a security system according to another embodiment.

FIG. 9 is a block diagram illustrating a security system 3 according to another embodiment.

Referring to FIG. 9, the security system 3 may be implemented as a personal computer (PC), a data server, or a portable electronic device.

The security system 3 may include a system on chip (SoC) 2000, a camera module 2100, a display 2200, a power source 2300, an input/output (I/O) port 2400, a memory 2500, a storage 2600, an external memory 2700, and a network device 2800.

The camera module 2100 means a module capable of converting an optical image into an electrical image. Accordingly, the electrical image output from the camera module 2100 may be stored in the storage 2600, the memory 2500, or the external memory 2700. Also, the electrical image output from the camera module 2100 may be displayed on the display 2200.

The display 2200 may display data output from the storage 2600, the memory 2500, the I/O port 2400, the external memory 2700, or the network device 2800. The display 2200 may be the display device 1550 shown in FIG. 8.

The power source 2300 may supply an operating voltage to at least one of components. The power source 2300 may be controlled by the PMIC 1950 shown in FIG. 8.

The I/O port 2400 means a port capable of transmitting data to the security system 3 or data output from the security system 3 to an external device. For example, the I/O port 2400 may be a port connecting a pointing device such as a computer mouse, a port connecting a printer, or a port connecting a USB drive.

The memory 2500 may be implemented as a volatile memory or a non-volatile memory. According to an embodiment, a memory controller capable of controlling a data access operation, for example, a read operation, a write operation (or a program operation), or an erase operation on the memory 2500, may be integrated into or embedded in the SoC 2000. According to another embodiment, the memory controller may be implemented between the SoC 2000 and the memory 2500.

The storage 2600 may be implemented as a hard disk drive or a solid state drive (SSD).

The external memory 2700 may be implemented as a secure digital (SD) card or a multimedia card (MMC). According to an embodiment, the external memory 2700 may be a subscriber identification module (SIM) card or a universal subscriber identity module (USIM) card.

The network device 2800 means a device capable of connecting the security system 3 to a wired network or a wireless network.

As described above, even after the system on chip is shipped, the key for authentication may be changed, which may further strengthen the security of the system on chip.

While the inventive concept has been particularly shown and described with reference to embodiments thereof, it will be understood that various changes in form and details may be made therein without departing from the spirit and scope of the following claims.

What is claimed is:

1. A security system comprising:
   an external device configured to transmit an input key; and
   a system on chip configured to authenticate the external device based on the input key,
   wherein the system on chip comprises
   a non-volatile memory comprising a key storage region in which at least one piece of key data is stored, and a key indicator region in which key indicator data, indicating a storage location in the key storage region, is stored;
   a secure processor configured to control the non-volatile memory; and
   an authenticator configured to identify the storage location by using the key indicator data, obtain the key data stored in the storage location from the non-volatile memory, and perform an encryption algorithm by using the input key and an asymmetric key of the key data as inputs,
   wherein the key indicator region comprises at least one bit cell which is in a free state or is programmed, the at least one bit cell corresponds to the key indicator data, and
   wherein, when the external device is authenticated, the secure processor is further configured to provide data for programming a bit cell in the free state, and address corresponding to the bit cell, and a write command to the non-volatile memory to update the key indicator data.

2. The security system of claim 1, wherein
   the key storage region comprises first to N-th slots (N is an integer greater than or equal to 2), and
   the key indicator region comprises first to N-th bit cells respectively corresponding to first to N-th bit positions.

3. The security system of claim 2, wherein, when first to k-th bit cells (k is a natural number less than or equal to N) respectively corresponding to the first to k-th bit positions among the first to N-th bit cells are programmed, the storage location is a k-th slot among the first to N-th slots.

4. The security system of claim 1, wherein the authenticator is configured to,
   when the external device is authenticated, receive a key change command and valid key data from the external device,
   identify an empty storage location in the key storage region by using the key indicator data, and
   provide slot data indicating the empty storage location and the valid key data to the secure processor, and
   wherein the secure processor is further configured to
   provide an address corresponding to the empty storage location, the valid key data, and a write command to the non-volatile memory, and
   control the non-volatile memory to update the key indicator data.

5. A method of authenticating an external device, the method comprising:
   obtaining key indicator data from a key indicator region of a one time programmable (OTP) memory, the key indicator region comprises at least one bit cell which is in a free state or is programmed, the at least one bit cell corresponds to the key indicator data;
   identifying a slot in which key data is stored among a plurality of slots included in the OTP memory, by using the key indicator data;
   obtaining an asymmetric key by reading the key data from the OTP memory;
   performing an encryption algorithm to authenticate the external device by using an input key received from the external device and the asymmetric key as inputs; and
   in response to the external device being authenticated, providing data for programming a bit cell in the free state, an address corresponding to the bit cell, and a write command to the OTP memory to update the key indicator data.

6. The method of claim 5, further comprising:
   receiving a key change command and new key data from the external device in response to the external device being authenticated.

7. The method of claim 6, further comprising:
   identifying an empty slot among the plurality of slots by using the key indicator data.

8. The method of claim 7, further comprising:
   storing the new key data in the empty slot.

9. The method of claim 8, further comprising:
   updating the key indicator data.

10. The method of claim 9, further comprising:
    obtaining the new key data in response to a new authentication request from an unauthorized device different from the external device.

11. The method of claim 10, wherein the new key data is valid data.

* * * * *